United States Patent
Heck et al.

(10) Patent No.: US 10,208,843 B2
(45) Date of Patent: Feb. 19, 2019

(54) RECIRCULATION CROSSOVER INSERT AND LINEAR MOTION ASSEMBLY THEREWITH

(71) Applicant: MEGGITT-USA, INC., Simi Valley, CA (US)

(72) Inventors: Mason E. Heck, Standish, MI (US); Stephen R. Ahlers, Saginaw, MI (US)

(73) Assignee: LINEAR MOTION, LLC, Bingham Farms, MI (US)

( * ) Notice: Subject to any disclaimer, the term of this patent is extended or adjusted under 35 U.S.C. 154(b) by 401 days.

(21) Appl. No.: 15/071,985

(22) Filed: Mar. 16, 2016

(65) Prior Publication Data
US 2016/0273633 A1    Sep. 22, 2016

Related U.S. Application Data

(60) Provisional application No. 62/133,962, filed on Mar. 16, 2015.

(51) Int. Cl.
*F16H 25/22*        (2006.01)
(52) U.S. Cl.
CPC ............................... *F16H 25/2223* (2013.01)
(58) Field of Classification Search
CPC .................................................. F16H 25/2223
See application file for complete search history.

(56) References Cited

U.S. PATENT DOCUMENTS

| | | | | |
|---|---|---|---|---|
| 3,961,541 A | * | 6/1976 | Fund ................... | F16H 25/2223 74/424.87 |
| 4,905,534 A | * | 3/1990 | Andonegui ......... | F16H 25/2223 74/424.87 |
| 5,622,082 A | * | 4/1997 | Machelski .......... | F16H 25/2223 74/424.86 |
| 5,937,700 A | * | 8/1999 | Brown ................ | F16H 25/2223 74/424.86 |
| 6,454,042 B1 | * | 9/2002 | Yoshida ............... | B62D 5/0448 180/444 |
| 6,736,235 B2 | * | 5/2004 | Yoshida ............... | B62D 5/0427 180/444 |

* cited by examiner

*Primary Examiner* — Terence Boes
(74) *Attorney, Agent, or Firm* — John D. Wright; Dickinson Wright PLLC

(57) ABSTRACT

A linear motion assembly and recirculation insert therefor is provided. The assembly includes a ball nut having a through bore with an internal helical groove and a screw having an external helical groove. The external helical groove is radially aligned with the internal helical groove to define a plurality of ball raceways. A plurality of inserts is fixed within the bore of the ball nut. The inserts each have a central body fixed within a recessed pocket of the ball nut, with the body having a radially inwardly facing, generally s-shaped groove to route the balls between adjacent turns. A pair of legs extends in opposite directions from the central body, wherein the legs are sized for a clearance fit with the external helical groove. The legs merge with the central body over a smooth transition region that minimizes stress concentrations at the joint between the legs and central body.

10 Claims, 3 Drawing Sheets

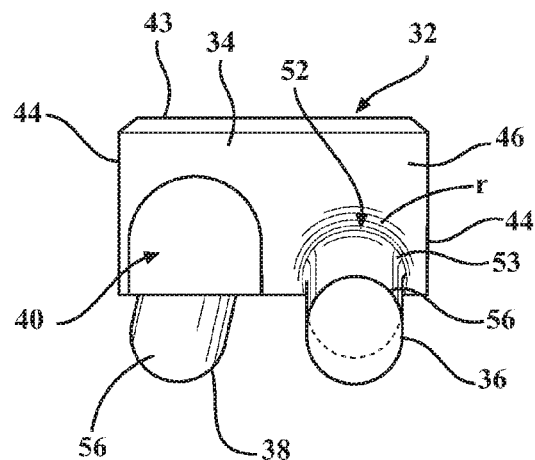
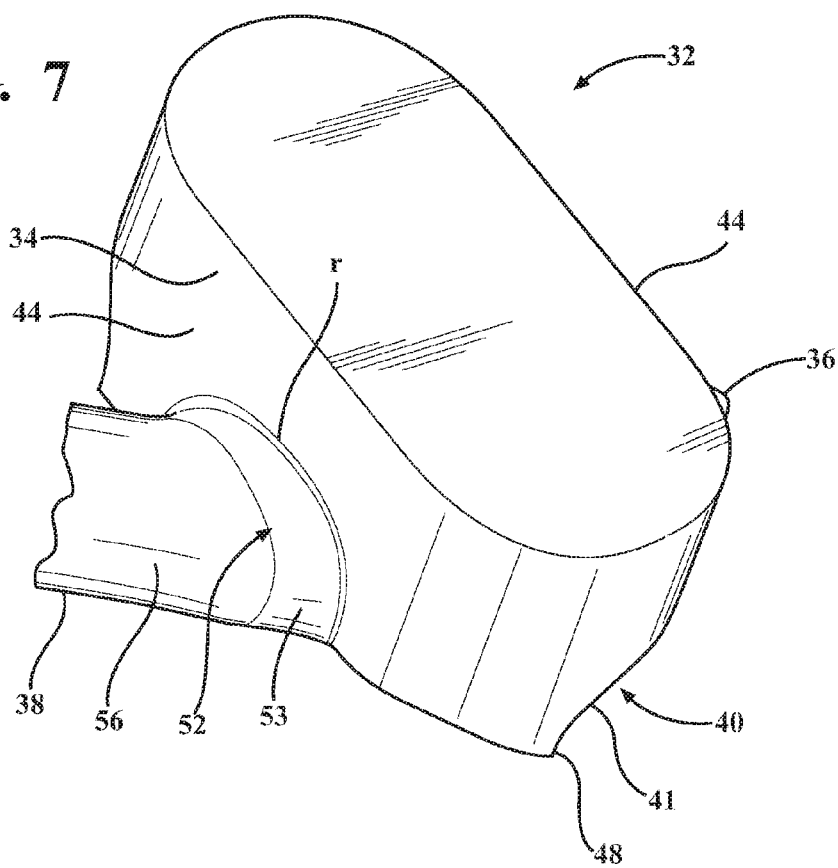

RECIRCULATION CROSSOVER INSERT AND LINEAR MOTION ASSEMBLY THEREWITH

CROSS-REFERENCE TO RELATED APPLICATION

This application claims the benefit of U.S. Provisional Application Ser. No. 62/133,962, filed Mar. 16, 2015, which is incorporated herein by reference in its entirety.

BACKGROUND OF THE INVENTION

1. Technical Field

This invention relates generally to linear motion assemblies, and more particularly to ball recirculation inserts therefor and assemblies therewith.

2. Related Art

Linear motion assemblies including recirculating balls, such as ball screw assemblies, for example, are used to effect linear actuation in various industries, such as machine tool, automotive, aircraft and aerospace, for example. Typically, a commercial ball screw assembly includes a screw with a continuous external helical ball groove and a ball nut with a continuous internal helical ball groove. The external helical ball groove of the ball screw and the internal helical ball groove of the ball nut are configured with substantially identical, continuous and uninterrupted leads (turns per inch). With the ball nut received coaxially and concentrically about the ball screw, the respective internal and external helical ball grooves are arranged in mirrored, opposite relation with one another in radially aligned relation, and a plurality of balls are disposed in a helical ball raceway formed between the aligned internal and external helical ball grooves.

Various ball return mechanisms are used to recirculate the balls, depending on the type of application. In some cases, a single ball return mechanism can be used to recirculate the balls over a single helical raceway, and in other cases, a plurality of ball return mechanisms can be used to recirculate the balls over a plurality of helical raceways. Where a plurality of helical raceways is formed, one type of ball return mechanism employed is commonly referred to as a crossover, button insert, or various combinations thereof. A crossover type insert, fixed with a recessed pocket of the ball nut, recirculates balls between immediately adjacent helical turns, such that the balls traverse a helical raceway for about 300-310 degrees, and are then recirculated over the remaining 60-50 degrees via the crossover insert. It is further known to provide the crossover inserts having a pair of oppositely extending curvilinear legs projecting laterally from a body of the crossover inserts, such that the legs curve away from the body to seat in a helical groove of the screw. The intended function of the legs is to come into play only during a failure scenario, such as if some or all of the balls were inadvertently fall out of the assembly. During such as failure, the legs are intended to serve as a backup sliding surface between the nut and screw to prevent freewheeling of the screw relative to the nut. During normal use, the legs are intended to remain in a clearance fit, in their entirety, within the ball raceway, and thus, are intended to remain in clearance relation within the helical grooves of both the screw and the nut. Accordingly, during normal intended use the legs are not contacted by either the nut or the screw, but rather, remain in free floating relation therebetween. However, during use of the ball screw assembly, wear of the screw, nut and balls occurs, thereby resulting in axial and radial lash between the screw and nut. The lash increases over continued use, and as such, over an extended period of time, the legs can eventually come into contact with a helical land of the screw thread. If left unaddressed, continued and ever increasing contact between the legs and the helical land can result in stress fractures within a union region between the leg and the body of the crossover insert, ultimately resulting in the leg breaking away from the body of the crossover insert.

SUMMARY OF THE INVENTION

A linear motion assembly constructed in accordance with one aspect of the invention includes a ball nut having a through bore extending between opposite ends, with the through bore having an internal helical groove. The assembly further includes a screw, having an external helical groove, disposed through the through bore of the ball nut, with the external helical groove being radially aligned with the internal helical groove to define a plurality of ball raceways. A plurality of crossover inserts is fixed within the bore of the ball nut to recirculate balls between adjacent turns of individual ball raceways. The crossover inserts each have a central body fixed within a recessed pocket of the ball nut, with the crossover inserts having a radially inwardly facing, generally s-shaped groove extending axially across the central body to route the balls between the adjacent turns. The crossover inserts further include a pair of legs extending from the central body in opposite directions from one another, wherein the legs are sized for a clearance fit with the external helical groove of the screw. The legs merge into the central body over a smooth transition region, wherein the transition region functions to minimize stress concentrations at the joint of the legs and central body, thereby resisting the formation of fatigue cracks.

In accordance with another aspect of the invention, the transition region includes a radii portion attached directly to the central body and a tapered portion extending from the radii portion away from the central body to further resist cracks from forming between the legs and the central body.

In accordance with another aspect of the invention, the legs are generally oblong-shaped having opposite sides and a width extending between the opposite sides, wherein the radii portion has a radius between about 9-15% of the width.

In accordance with another aspect of the invention, the tapered portion has an angle of inclination extending between the radii portion and the generally constant cross-sectional area portion between about 5-10% of the width of the legs.

In accordance with another aspect of the invention, the tapered portion extends a distance away from the radii portion between about 20-30% of the width of the legs.

A crossover insert constructed in accordance with another aspect of the invention is provided. The crossover insert includes a central body having a radially inwardly facing, generally s-shaped groove extending axially across the central body to route balls between the adjacent turns of a ball screw assembly. The crossover inserts further include a pair of arcuate legs extending from the central body in opposite directions from one another, wherein the legs are sized for a clearance fit with external helical grooves of a screw of the ball screw assembly. The legs merge into the central body over a smooth transition region, wherein the transition region minimizes stress concentrations at the joint between the legs and central body, thereby resisting the formation of fatigue cracks.

In accordance with another aspect of the invention, the transition region of the crossover insert includes a radii portion attached directly to the central body and a tapered portion extends from the radii portion away from the central body.

In accordance with another aspect of the invention, the legs of the crossover insert are generally oblong-shaped having opposite sides and a width extending between the opposite sides, wherein the radii portion has a radius between about 9-15% of the width.

In accordance with another aspect of the invention, the tapered portion of the crossover insert has an angle of inclination extending between the radii portion and the generally constant cross-sectional area portion between about 5-10% of the width of the legs.

In accordance with another aspect of the invention, the tapered portion of the crossover insert extends a distance away from the radii portion between about 20-30% of the width of the legs.

BRIEF DESCRIPTION OF THE DRAWINGS

These and some other objects, features and advantages of the invention will become readily apparent to those having ordinary skill in the art of recirculating ball-type linear motion assemblies in view of the following detailed description of the presently preferred embodiments and best mode, appended claims, and accompanying drawings, in which:

FIG. 6 is an end elevation view of the crossover insert of FIG. 2; and

FIG. 7 is an enlarged fragmentary view of the crossover insert of FIG. 2.

DETAILED DESCRIPTION OF PRESENTLY PREFERRED EMBODIMENTS

Figure 1:
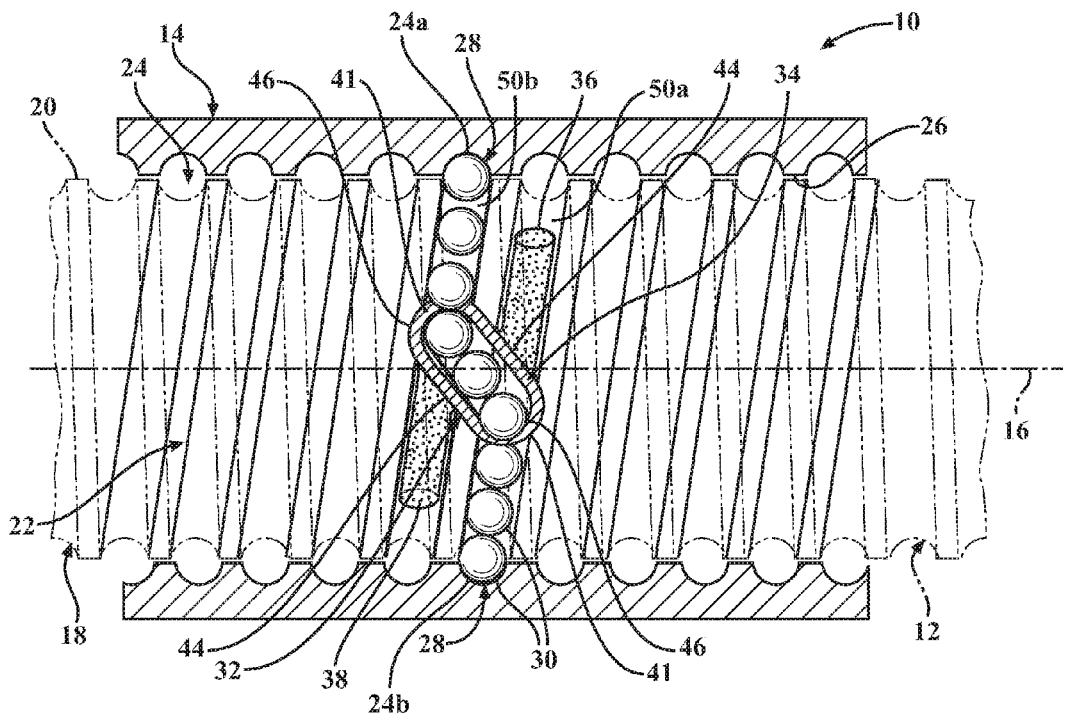
FIG. 1 is a cross-sectional view of a linear motion assembly constructed in accordance with one presently preferred aspect of the invention.

Referring now in more detail to the drawings, FIG. 1 illustrates a linear motion assembly, shown as a ball screw assembly, by way of example and without limitation, referred to hereafter simply as assembly 10, constructed in accordance with one aspect of the invention. The assembly 10 includes an elongate shaft, also referred to as ball screw or simply screw 12, assembled coaxially within a ball nut or simply nut 14, along a central axis 16 about which relative rotation between the screw 12 and nut 14 occurs during use. The screw 12 has a helical external groove 18 extending continuously over a plurality of circumferential turns with a radially outwardly extending, continuous helical land 20 formed between immediately adjacent turns of the external groove 18. The nut 14 has a through bore 22 configured for receipt of the screw 12 therethrough. The nut 14 has a helical internal groove 24 extending over a plurality of circumferential turns with a radially inwardly extending helical land 26 formed between immediately adjacent turns of the internal groove 24. The external groove 18 of the screw 12 is radially aligned in mirrored relation with the internal groove 24 of the nut 14 upon assembly to form a plurality of ball raceways 28, in which, a plurality of balls 30 are received for circulation therethrough. The balls 30 are recirculated through the separate raceways 28, across immediately adjacent turns, with the assistance of a recirculation crossover insert, also referred to as recirculation insert or simply as insert 32, constructed in accordance with the invention. It is to be understood that the balls 30 are in abutting relation and move continuously in a recirculating path when the screw 12 and nut 14 are relatively rotated. Although only a single insert 32 is illustrated for the sake of simplicity; one skilled in the art of linear motion assemblies will readily recognize the assembly 10 includes a plurality of the inserts 32, such as between about 4-10, depending on the size of the assembly and nature of the application.

The nut 14 is generally adapted for attachment to a member (not shown) which is required to move linearly along the axis 16 in response to rotation of the screw 12. The mechanisms typically used for attachment of the nut 14 to the member are generally known, such as via trunnions or direct attachment via fasteners to one or both of the ends of the nut 14, by way of example and without limitation. Alternatively, as is known in the art, the nut 14 could be axially fixed against movement and the screw 12 could be moveable in axially translational relation back and forth through the nut 14.

The insert 32 has a central, main body 34 and a pair of legs 36, 38 extending from opposite ends of the body 34 in opposite directions generally away from one another. The body 34 includes an arcuate, generally s-shaped, radially inwardly facing passage, channel, or groove 40, which, when the insert 32 is fixed in place within the bore 22 of the nut 14, faces radially inwardly toward the central axis 16 and extends diagonally relative to the central axis 16 of the nut and screw 12 to bridge the immediately axially adjacent turns 24a, 24b of the nut groove 24. The groove 40 brings the adjacent turns 24a, 24b into communication with one another to establish a circumferentially continuous turn, such that the balls 30 recirculate through the established continuous turn, which extends 360 degrees, with the insert 32 occupying between about 50-60 degrees of the turn, and the ball raceway 28 occupying between about 300-310 degrees of the turn, by way of example and without limitation. As such, depending on the direction of relative rotation between the screw 12 and nut 14, and depending on which direction the balls 30 are traveling, the groove 40 of the insert 32 provides an entrance or discharge at each opposing end 41 of the groove 40. The mediate or central portion of the groove 40 extending between the opposite ends 46 has a radially outwardly extending enlarged portion 42 that extends radially outwardly sufficiently to permit the train of balls 30 to travel up, radially outwardly, and over the land 20 of the screw 12, whereupon the balls 30 proceed to be reintroduced into the loaded ball raceway 28 for recirculation through the continuous 360 degree turn, in either direction, depending on the relative rotational direction between the screw 12 and nut 14. The insert 32 separates respective turns 50a and 50b into non-ball path turn portions 50a, in which no balls circulate, and circumferentially continuous ball path turn portions 50b, in which the balls circulate.

Figure 2:
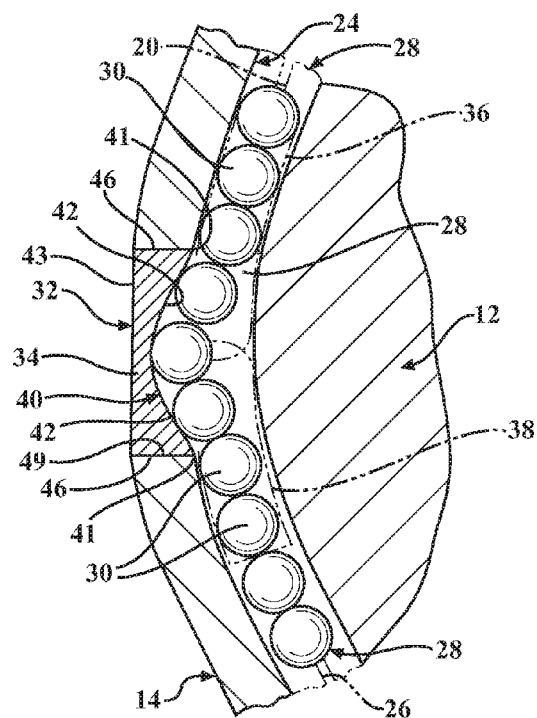
FIG. 2 is an enlarged fragmentary cross-sectional view of a crossover insert showing the recirculation of balls within the linear motion assembly of FIG. 1.
Figure 3:
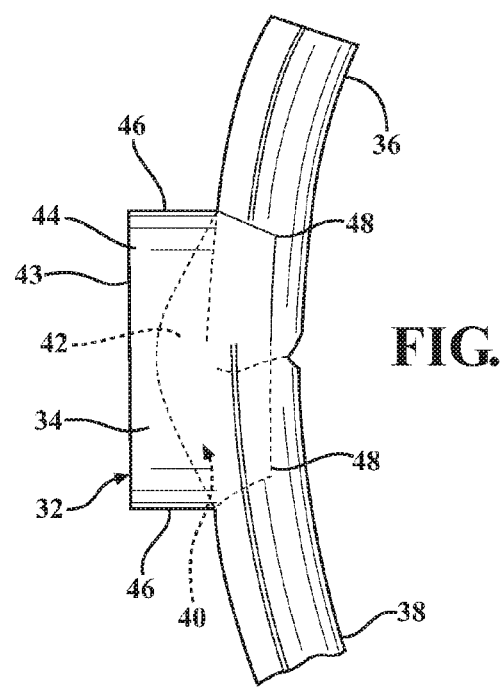
FIG. 3 is a side elevation view of the crossover insert of FIG. 2.

The insert 32 is generally U-shaped in lateral cross-section taken through a top wall 43 and side walls 44 wherein the top wall 43 forms a base of the U-shape and the side walls 44 form opposite sides of the U-shape. The body 34 also has opposite ends 46 with projecting portions 48 extending radially inwardly to form ball deflectors, as shown, which serve to facilitate smooth entrance of the balls 30 into the groove 40. The ends 46 terminate radially adjacent the screw land 20 and direct the balls 30 over the screw land 20, as detailed above, into the transfer groove 40 to pass the recirculating balls 30 from one nut groove turn to the immediately axially adjacent nut groove turn. The body 34 is preferably sized to be press fit into receptacle or recessed pocket 49 (FIG. 2) in the wall bounding the bore 22 of the nut 14 so that the insert 32 remains fixed in position in the wall of the nut 14.

Figure 4:
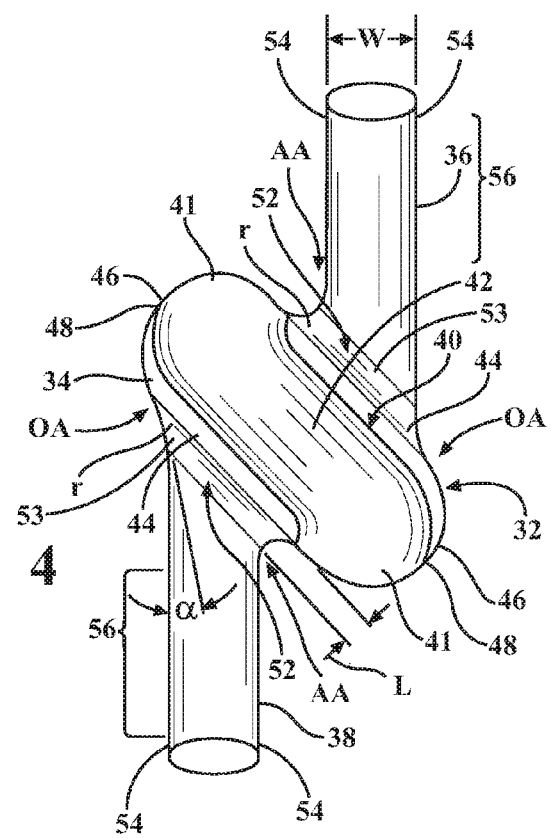
FIG. 4 is bottom plan view of the crossover insert of FIG. 2.
Figure 5:
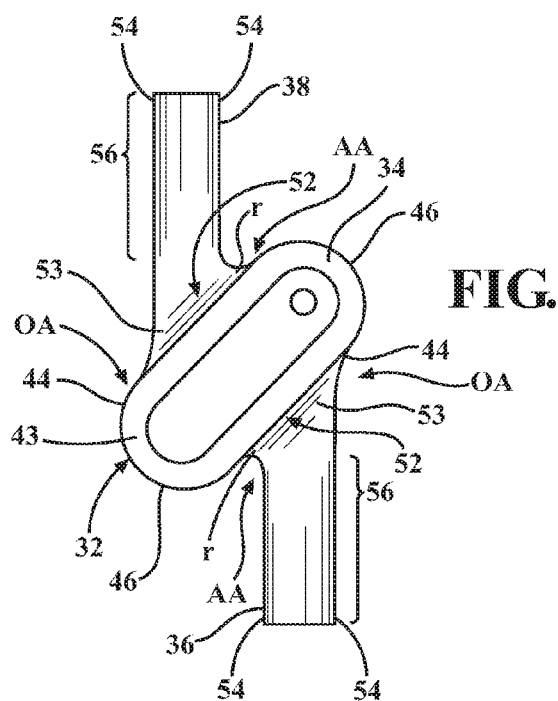
FIG. 5 is top plan view of the crossover insert of FIG. 2.

The legs 36, 38 extend outwardly from the insert body 34 adjacent the opposite ends 46 of the insert body 34 such that the legs 36, 38 extend in opposite directions from one another along an arcuate path generally helically from the sidewalls 44 of the body 34 to provide the insert 32 with a generally z-shape in plan view (FIGS. 4 and 5). The legs 36, 38 are generally oval in lateral cross-section and as viewed looking along their length, such as shown in FIGS. 4 and 6. The legs 36, 38 are received in the screw groove 18 and, as shown in phantom in FIG. 2, also extend within the nut groove 24. The legs 36 and 38 curve outwardly from the body 34 at radii taken from the axis 16, and thus, are generally arched to follow the contour of the grooves 18, 24 in the screw 12 and nut 14. The legs 36, 38 extend at the pitch angle of the nut groove 24 and are sized with sufficient clearance fit to accommodate lash between the screw 12 and nut 14 during use and to avoid the imposition of undue interference and friction against the surface of the groove 24.

When the assembly 10 is fully operable and functioning as intended, the legs 36, 38 are intended to remain free and out of contact with any surfaces of the screw 12 and nut 14. However, as wear results to the screw 12, the nut 14 and the balls 30, axial and radial lash between the screw 12 and nut 14 gradually increases, and thus, the lands 20 of the screw 12 eventually begin to make contact with side surfaces 54 (best identified FIGS. 4 and 5) of the legs 36, 38, and as a result, the legs 36, 38 can experience side loading. As the side loading increases, so too does the stress within a region of attachment of the legs 36, 38 to the insert body 34. In order to prevent the stress from causing stress cracks within the attachment region, the legs 36, 38 merge with the central body 34 within the region of attachment to the body 34 over a generally smooth, annular transition surface 52. Accordingly, there are no or substantially no sharp corners or edges throughout the attachment region where the legs 36, 38 merge with and join the insert body 34.

The annular transition surface 52 is formed having an annular transitioning radii portion (r) extending immediately between the legs 36, 38 and the insert body 34 and a gradually tapered portion 53 extending away from the radii portion (r) and away from the insert body 34. The tapered portion 53 is generally conical, such that the lateral cross-sectional area within the tapered portion 53 changes constantly along the length of the tapered portion 53. The transition surface 52 can be formed as a monolithic piece of material within the material of insert body 34, such as if the insert body 34 is formed initially as a casting, whereupon the casting can then be finish machined afterward to complete the finished part, wherein the transition surface 52 is machined smooth to form the smoothly extending transitioning radii portion (r) attaching the legs 36, 38 directly to the insert body 34.

The radii portion (r) are formed having a radii of curvature to not only prevent stress crack propagation, but also to prevent interference with the land 26 of the nut 14 and the land 20 of the screw 12, and thus, to maintain a clearance relation therewith. It has been found that radii (r) having a proportional relationship to a width (w, identified in FIG. 4) of the legs 36, 38, such as between about 9-15% of the width (w), is optimal for both purposes. The annular radius (r) optimally extends about the entirety or substantially entirety of the circumferential outer periphery legs 36, 38, including throughout an acute angle region AA interior to and between the legs 36, 38 and an obtuse angle region OA exterior to and between the legs 36, 38; however, due to the extent of the tapered portion 53 in the obtuse angle region OA, the radius (r) appears less pronounced than in the acute angle region AA.

The tapered portion 53 is formed having a gradual taper so as to gently merge or transition the radius (r) with a portion 56 of the legs 36, 38 having a constant or substantially constant cross-sectional area. It has been found that with the tapered portion 53 extending a distance between about 20-30% of the width (w) from the radius (r) provides the optimal length (L, FIG. 4) of the tapered portion 53 to best reduce potential crack forming stresses, while also minimizing the potential for interference with the screw and nut lands 20, 26. It has further been found that the angle of taper inclination (a, FIG. 4) from the constant cross-section area portion 56 of the legs 36, 38 to the radius (r) is optimally form between about 5-10% of the width (w).

Of course, rather than initially forming the insert body 34 as a casting, the insert body 34 could be machined from a solid piece of material, or otherwise molded to produce the finished part. In addition, it is contemplated that the transition surface 52 could be formed or enhanced by adding material to the already formed inert body 34. In this scenario, the legs 36, 38 may be formed as a monolithic piece of material with the insert body 34, and the material forming at least a portion of the transition surface 52 can be added afterward in any suitable additive material deposit process. Accordingly, it should be recognized the material forming the transition surface 52 can be the same as or different from the material forming the insert body 34. Further yet, it is contemplated that the legs 36, 38 could be formed separate from the insert body 34 and subsequently welded or otherwise bonded to the insert body 34, thereby forming the transition surface 52 in the process of joining the legs 36, 38 to the insert body 34, such as via material formed by a weld joint.

It is to be understood that it is only when the function of the train of balls 30 is substantially destroyed, and the screw 12 and nut 14 would otherwise freewheel, that the legs 36, 38 become operative to engage the respective grooves 18, 24 of the screw 12 and nut 14 to slow and control relative motion between the screw 12 and nut 14.

It should be recognized that upon reading the disclosure herein, one ordinarily skilled in the art of ball screw assemblies would readily recognize other embodiments than those expressly discussed herein, with those embodiments being within the spirit and scope of the invention. The scope of the invention is defined by the following claims, and any claims which issue as a result of an application related hereto.

What is claimed is:

1. A linear motion assembly, comprising:
a ball nut having a through bore extending between opposite ends, said through bore having an internal helical groove;
a screw having an external helical groove, said screw extending through said through bore of said ball nut with said external helical groove being radially aligned with said internal helical groove to define a plurality of ball raceways;

a plurality of balls disposed in said ball raceways, said balls having a ball diameter;

a plurality of crossover inserts fixed within said bore of said ball nut to recirculate said balls between adjacent turns of individual ball raceways, said crossover inserts each having a central body fixed within a recessed pocket of said ball nut and having a radially inwardly facing, generally s-shaped groove extending axially across said central body to route the balls between said adjacent turns, said crossover inserts further including a pair of legs extending outwardly from said central body in opposite directions from one another, wherein said legs are sized for a clearance fit with said external helical groove of the screw, said legs merging with the central body over a smooth transition region, wherein said transition region minimizes stress concentrations between said legs and said central body; and wherein said transition region includes a radii portion extending directly to said central body and a tapered portion extending from said radii portion away from said central body.

2. The linear motion assembly of claim 1 wherein said legs have a generally constant cross-sectional area portion extending from said tapered portion toward free ends of said legs.

3. The linear motion assembly of claim 1 wherein said legs are generally oblong-shaped having opposite sides and a width extending between said opposite sides, said radii portion having a radius between about 9-15% of said width.

4. The linear motion assembly of claim 3 wherein said tapered portion has an angle of inclination extending between said radii portion and said generally constant cross-sectional area portion between about 5-10% of said width.

5. The linear motion assembly of claim 4 wherein said tapered portion extends a distance away from said radii portion between about 20-30% of said width.

6. A crossover insert for a linear motion assembly, comprising:

a central body having a radially inwardly facing, generally s-shaped groove extending axially across said central body and further including a pair of arcuate legs extending outwardly from said central body in opposite directions from one another, said legs merging with said central body over a smooth transition region, wherein said transition region minimizes stress concentrations between said legs and said central body; and wherein said transition region includes a radii portion extending directly to said central body and a tapered portion extending from said radii portion away from said central body.

7. The crossover insert of claim 6 wherein said legs have a generally constant cross-sectional area portion extending from said tapered portion toward free ends of said legs.

8. The crossover insert of claim 6 wherein said legs are generally oblong-shaped having opposite sides and a width extending between said opposite sides, said radii portion having a radius between about 9-15% of said width.

9. The crossover insert of claim 8 wherein said tapered portion has an angle of inclination extending between said radii portion and said generally constant cross-sectional area portion between about 5-10% of said width.

10. The crossover insert of claim 9 wherein said tapered portion extends a distance away from said radii portion between about 20-30% of said width.

* * * * *